United States Patent [19]
Kulik

[11] 4,231,996

[45] Nov. 4, 1980

[54] METHOD FOR PRODUCING AMMONIA AND HYDROGEN SULFIDE

[75] Inventor: Metro D. Kulik, Pittsburgh, Pa.

[73] Assignee: Continental Oil Company, Stamford, Conn.

[21] Appl. No.: 50,239

[22] Filed: Jun. 20, 1979

Related U.S. Application Data

[63] Continuation-in-part of Ser. No. 966,686, Dec. 5, 1978, abandoned.

[51] Int. Cl.$^3$ .............................................. C01B 17/04
[52] U.S. Cl. ............................... 423/242; 423/567 R; 423/571
[58] Field of Search ............... 423/562, 567, 573, 356, 423/242 A, 571

[56] References Cited

U.S. PATENT DOCUMENTS

| | | | |
|---|---|---|---|
| 3,536,618 | 10/1970 | Urban et al. ...................... | 423/562 X |
| 3,627,470 | 12/1971 | Hamblin ........................... | 423/573 X |
| 3,728,439 | 4/1973 | Urban ............................... | 423/567 A |
| 3,773,662 | 11/1973 | Urban ............................... | 423/573 X |

*Primary Examiner*—G. O. Peters
*Attorney, Agent, or Firm*—F. Lindsey Scott; William A. Mikesell, Jr.

[57] ABSTRACT

A method for producing ammonia and hydrogen sulfide in a molar ratio ($NH_3/H_2S$) from about 2.8 to about 3.7 from an aqueous ammonium thiosulfate solution by a method consisting essentially of: (a) contacting the aqueous ammonium thiosulfate solution with hydrogen sulfide at a temperature from about 260° to about 360° F. (125° to 182° C.) at a pressure greater than 100 psig to react at least about 70 percent of the thiosulfate to produce an aqueous solution containing ammonium polysulfide; and (b) heating the resulting aqueous ammonium polysulfide solution to produce ammonia and hydrogen sulfide in a molar ratio ($NH_3/H_2S$) from about 2.8 to about 3.7 and sulfur.

1 Claim, 1 Drawing Figure

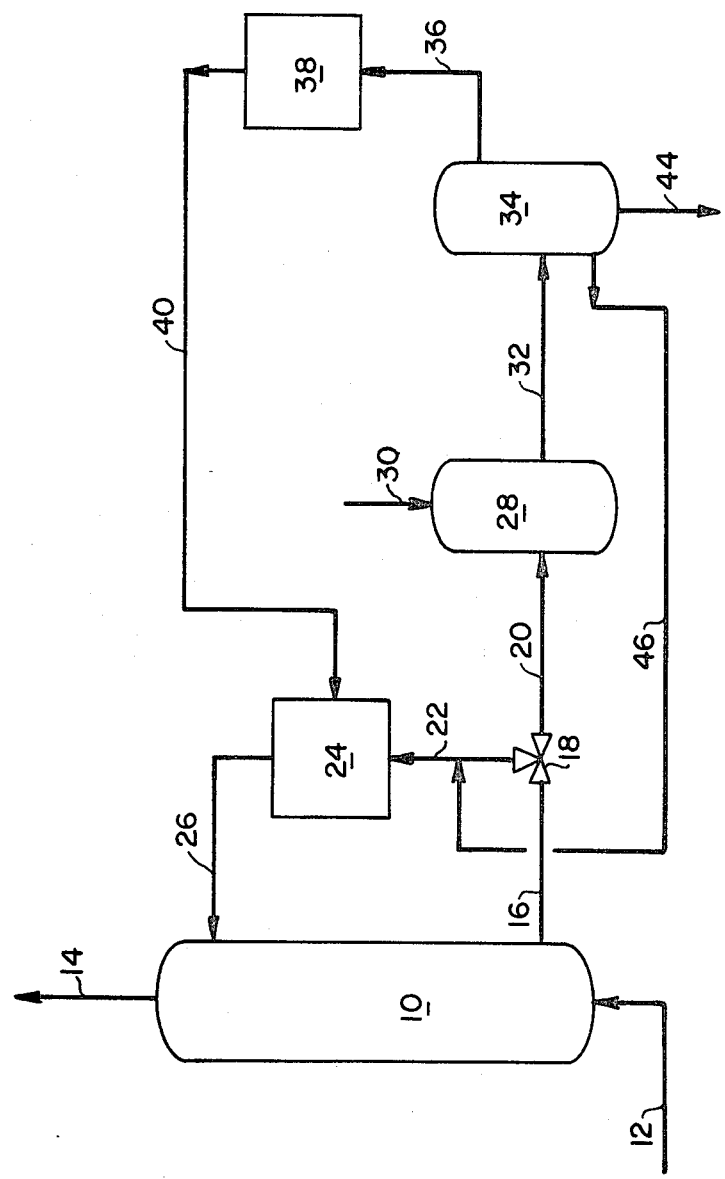

METHOD FOR PRODUCING AMMONIA AND HYDROGEN SULFIDE

This application is a continuation-in-part of my earlier filed application, U.S. Ser. No. 996,686, of the same title filed Dec. 5, 1978, now abandoned.

This invention relates to methods for producing ammonia and hydrogen sulfide.

This invention also relates to methods for producing ammonia and hydrogen sulfide in a molar ratio ($NH_3/H_2S$) from about 2.8 to about 3.7.

This invention also relates to an improvement in methods for removing sulfur oxides from gaseous mixtures wherein the sulfur oxides are absorbed and converted to ammonium thiosulfate which is passed to sulfur recovery, wherein the improvement comprises contacting the ammonium thiosulfate with hydrogen sulfide at defined conditions to produce ammonia and hydrogen sulfide in a desired ratio for recycle to the sulfur oxide absorption zone.

There has been a continuing interest for many years in the removal of sulfur oxides from stack gases and other such gaseous mixtures which contain sulfur oxides such as $SO_2$. Such stack gases are produced by the combustion of sulfur-containing carbonaceous fuels such as petroleum, coal of various grades and the like. As the apparent shortage of petroleum fuels has become more widely recognized, there has been an increasing effort to substitute coal and other more abundant fuels for petroleum fuels. Such increased use of coal has re-emphasized the need for effective sulfur oxide removal techniques.

In one such method, the sulfur oxides are absorbed from gaseous mixtures containing sulfur oxides such as stack gases and the like by contacting the gaseous mixtures with an aqueous solution containing ammonia or ammonium hydroxide and ammonium thiosulfate. The sulfur oxides are absorbed in the solution to produce ammonium sulfite or ammonium bisulfite with the resulting solution being removed from a lower portion of the column with at least a portion of the aqueous stream withdrawn from the lower portion of the column being recycled to the upper portion of the column for use in contacting additional quantities of the gaseous mixture. Typically the recycle stream is mixed with ammonia and hydrogen sulfide or a sulfide salt such as ammonium sulfide or ammonium bisulfide to convert the ammonium sulfite or ammonium bisulfite into ammonium thiosulfate prior to recycling the aqueous stream to the upper portion of the column. Normally the hydrogen sulfide is added in an amount equal to, or less than, that stoichiometrically required to convert the ammonium sulfite or ammonium bisulfurite into ammonium thiosulfate. At least a portion of the stream withdrawn from the lower portion of the scrubber is passed to sulfur recovery. This stream is an aqueous stream containing ammonium thiosulfate in relatively high concentrations, for instance, up to as much as about 50 weight percent ammonium thiosulfate. This stream is relatively concentrated in ammonium thiosulfate since it is desirable that reasonably high concentrations of sulfur-containing material be present in the streams passed to sulfur recovery. The accumulation of substantial quantities of ammonium thiosulfate in the recycle stream does not adversely affect the sulfur oxide absorption and as indicated, is beneficial in the sulfur recovery zone.

In the U.S. Pat. No. 3,536,618 a method is disclosed whereby ammonium thiosulfate may be converted into ammonium polysulfide by contacting the ammonium thiosulfate in an aqueous solution with hydrogen sulfide at a temperature from about 200 to about 700° F. (93° to 372° C.), preferably from about 325° F. to about 400° F. (163° to 204° C.) at a pressure from about 100 to about 5000 psig to produce ammonium polysulfide. The ammonium polysulfide is then passed to thermal decomposition and decomposes to yield ammonia, hydrogen sulfide and elemental sulfur. There is no indication that the ratio of ammonium to hydrogen sulfide so produced is controlled or that this ratio could be controlled in any way other than separating the two materials and recombining them in the desired proportions. In the process set forth above, the addition of ammonia and hydrogen sulfide to the recycle stream is required in a ratio of approximately 3. In view of the need for ammonia and hydrogen sulfide in a mol ratio ($NH_3/H_2S$) of about 3, it has now been found that ammonia and hydrogen sulfide can be produced in the desired ratio upon the decomposition of the ammonium polysulfide by an improvement which comprises:

(a) contacting an aqueous ammonium thiosulfate solution with hydrogen sulfide at a temperature from about 260° to about 360° F. (125°–182° C.) at a pressure greater than 100 psig to react at least 70% the ammonium thiosulfate to produce an aqueous solution containing ammonium polysulfide; and (b) heating the resulting ammonium polysulfide solution to produce ammonia and hydrogen sulfide in a molar ratio ($NH_3/H_2S$) from about 2.8 to about 3.7 and sulfur.

The FIGURE shows a sulfur oxide scrubbing process wherein the improvement of the present invention is useful. A scrubber 10 having a gas inlet 12 and a desulfurized gas outlet 14 is shown. An aqueous stream containing ammonium thiosulfate, ammonium sulfite and ammonium bisulfite is removed from a lower portion of scrubber 10 via a line 16 and passed to a splitter valve 18 where the stream is divided into a first portion which passes through a line 20 to sulfur recovery, and a second portion which passes through a line 22 to recycle to an upper portion of scrubber 10. A mixing zone 24 is positioned in the recycle loop to scrubber 10 and provides for the mixing of ammonia and hydrogen sulfide in a molar ratio ($NH_3/H_2S$) of about 3 with the recycle stream flowing through line 22. The ammonia and hydrogen sulfide are added in a molar ratio of from about 2.8 to about 3.7 and in many instances will be added in a molar ratio approximating 3. The hydrogen sulfide is added in an amount sufficient to convert the ammonium sulfite and ammonium bisulfite contained in the aqueous stream into ammonium thiosulfate. It is desirable that the hydrogen sulfide be added in no more than the stoichiometric amount required to so convert the sulfite compounds since there is the possibility that any unreacted hydrogen sulfide could be released in desulfurized stream 14. The stream so produced in zone 24 by the mixture of the ammonia and hydrogen sulfide with the stream from line 22 is recycled via a line 26 to scrubber 10 and used to absorb additional quantities of sulfur oxides. Clearly the ammonium thiosulfate concentration of the recycling stream will increase with time as more sulfur oxides are absorbed and when the ammonium thiosulfate reaches a desired level a portion of the stream recovered through line 16 is withdrawn through line 20 and passed to sulfur recovery. The aqueous ammonium thiosulfate, ammonium sulfite and ammonium bisulfite flowing through line 20 is contacted with hydrogen sulfide in a reactor 28. In reactor 28, ammonium polysulfide is produced with the aqueous reactor product from reactor 28 which contains the ammonium polysulfide produced in reactor 28 and unreacted ammonium thiosulfate flows through line 32 to a still 34 where the ammonium polysulfide is thermally decomposed into ammonia, hydrogen sulfide and elemental sulfur. The elemental sulfur is recovered from the lower portion of still 34 through a line 44 and if the temperature in still 34 is above the melting point of the sulfur, (120° to 130° C.) the sulfur may be recovered in molten form. Ammonia hydrogen sulfide and some water are recovered overhead through a line 36 and a condenser 38 and passed through a line 40 to recycle to column 10. Water is also recovered from still 34 via a line 46 and is desirably recycled to line 22 for recycle to reactor 10 since the water contains some unreacted ammonium thiosulfate.

The absorption of sulfur oxides can be considered to occur as set forth in reactions (1) and (2) below to produce ammonium sulfite and ammonium bisulfite.

$$2SO_2 + 2NH_4OH \rightarrow 2(NH_4)HSO_3 \qquad (1)$$

$$2SO_2 + 4NH_4OH \rightarrow 2(NH_4)_2SO_3 + 2H_2O \qquad (2)$$

The reaction of the ammonium bisulfite and ammonium sulfite to form ammonium thiosulfate is shown in reaction (3) below.

$$2(NH_4)HSO_3 + 2(NH_4)_2SO_3 + 2H_2S \rightarrow 3(NH_4)_2S_2O_3 + 3H_2O \qquad (3)$$

The process, in summary, can be shown as follows:

$$4SO_2 + 6NH_4OH + 2H_2S \rightarrow 3(NH_4)_2S_2O_3 + 5H_2O \qquad (4)$$

It will be observed that the ammonia and hydrogen sulfide are required in a molar ratio ($NH_3/H_2S$) of 3. It is noted that ammonia in aqueous solution will exist as ammonium hydroxide and that the hydrogen sulfide may be present as ammonium sulfide, ammonium bisulfide, hydrogen sulfide or the like. Such materials are considered to be substantially equivalent for purposes of the present discussion since they exist in equilibrium in aqueous solution and are chemically equivalent. It is clear that the ammonia and hydrogen sulfide charged to the system will be required in roughly an ammonia-hydrogen sulfide ratio of 3. By the improvement of the present invention, the ammonia and hydrogen sulfide are produced in a molar ratio ($NH_3H_2S$) of about 2.8 to about 3.7 and preferably in a molar ratio of about 2.8 to about 3.2.

Applicant has found that the ammonia and hydrogen sulfide can be produced in such a ratio by an improvement comprising reacting the aqueous ammonium thiosulfate with hydrogen sulfide at a temperature from about 125° to about 182° C. and at a pressure greater than about 100 psig. Desirably the ammonium thiosulfate concentration in the aqueous solution passed to reduction is from about 25 to about 35 weight percent ammonium thiosulfate based on the weight of the aqueous stream. The ammonium sulfite and ammonium bisulfite included in the stream should be considered as equivalents to ammonium thiosulfate for purposes of determining the weight percent. The reduction with hydrogen sulfide is desirably accomplished at a pressure in excess of 100 psig although it has been found that the pressure is not particularly critical so long as sufficient hydrogen sulfide is present to fulfill the reaction requirements. The temperature is within a range from about 125° to about 182° C. and the reaction in reactor 28 is allowed to continue until at least about 70 weight percent of the ammonium thiosulfate has been reacted. Typical reaction times are up to about 25 minutes. The reduction of the ammonium thiosulfate under such conditions has been found to produce an aqueous ammonium polysulfide containing stream which upon heating and decomposition of the ammonium polysulfide results in the production of elemental sulfur and the ammonia and hydrogen sulfide in a molar ratio of about 2.8 to about 3.7. While it is recognized that the use of hydrogen sulfide to reduce ammonium thiosulfate to ammonium polysulfide for subsequent thermal decomposition to produce ammonia, hydrogen sulfide and elemental sulfur has been known to those skilled in the art, it is believed that Applicant has now discovered an improvement whereby ammonia and hydrogen sulfide can be produced in the molar ratio desired for recycle to the scrubbing process. By the use of Applicant's improvement, it is no longer necessary to separate the ammonia and hydrogen sulfide for recombination in the desired ratio since the ratio desired can be produced upon heating the aqueous ammonium polysulfide containing stream. It has been found by Applicant that surprisingly the control of the conditions in the thermal decomposition zone is not critical, but rather the conditions in the ammonium polysulfide formation zone are highly critical. The concentration of the ammonium thiosulfate in the aqueous solution the percent conversion of ammonium thiosulfate and the temperature at which the reduction takes place must be within the ranges set forth herein. It has also been observed that very desirable results are accomplished when at least about 0.085 g moles per liter of ammonium thiosulfate remain in the aqueous product stream after $H_2S$ contacting. It appears that little or no $H_2S$ is present in the aqueous stream when ammonium thiosulfate is present. The results accomplished by Applicant's claimed improvement require that the reaction conditions at which the hydrogen sulfide reduction takes place be within the limits set forth above. As indicated, the pressure at which the reduction takes place is not especially critical although it is desired that the pressure be between about 100 and about 300 psig. The heating may be at a temperature from about 120° to about 185° C. although a temperature from about 120° to about 175° C. is preferred.

While the desired $NH_3/H_2S$ ratio is about 3.0 the ranges set forth herein are somewhat broader. In many process applications it may be desirable to shift the ratio to a higher or lower level to accommodate operating losses etc. The ratio produced by the improvement of the present inventor may be adjusted by varying the process conditions within the limits set forth above. In general, the $NH_3/H_2S$ ratio increases as the temperature and pressure increase and decreases as the concentration of unreacted ammonium thiosulfate in the product stream from the $H_2S$ contacting decreases below about 20 percent of the ammonium thiosulfate charged to hydrogen sulfide contacting. Thus, the improvement of the present invention can be used to tailor the $NH_3/H_2S$ ratio to the precise ratio desired within the range set forth. As indicated previously, the use of condenser 38 is optional and it may be considered desirable to recycle the entire overhead stream to mixing zone 24 for mixture with the recycle stream to scrubber 10. The condensation of the water component of the mixture flowing through line 40 may be accomplished by merely blending the stream with the stream flowing through line 22 into mixing zone 24 or by heat exchange means known to those skilled in the art. Such variations and modifications are clearly within the skill of those in the art and need not be discussed further since they form no part of the present invention.

Having thus described the invention by reference to certain of its preferred embodiments, it is pointed out that the embodiments described are illustrative rather than limiting in nature and that many variations and modifications are possible within the scope of the present invention. Such variations and modifications may appear obvious and desirable to those skilled in the art upon a review of the foregoing description of the preferred embodiments and the following examples.

EXAMPLES

A series of tests were conducted to demonstrate the invention.

The reactions were carried out in a one-liter stainless steel, stirred autoclave; which was provided with appropriately heated stainless steel piping for continuously feeding $H_2S$ gas and continuously and quantitatively withdrawing the reaction product gas. Aqueous acidic and basic scrubbers were used to absorb the exit $NH_3$ and $H_2S$. Liquid phase samples were withdrawn into a dry ice cooled vial which was equipped with a thin wall rubber balloon to prevent gas loss. The entire apparatus was contained in a well ventilated hood.

After charging the autoclave with the specified aqueous $(NH_4)_2S_2O_3$ solution, the entire system was purged and tested for leaks by pressurizing three times to 400 psig with nitrogen. The nitrogen was displaced by 25 purges with 50 psig of $H_2S$ (pressurized each time to 50 psig, then vented). With 50 psig of $H_2S$ pressure in the autoclave, the stirrer was started and the heaters were turned on to make either the static or continuous $H_2S$ flow run.

While stirring the temperature was raised to the desired level. The stirrer was then stopped for three minutes and about 5 ml of liquid was withdrawn as a purge through the liquid sampling tube. This purge sample was discarded. Another sample of about 5 ml was withdrawn into the cooled receiver. After cooling for about 10 minutes it was transferred to a vial and sealed. This sample was labeled as sample No. 1 and represented zero time of reaction.

Immediately after withdrawing sample No. 1, the stirrer was turned on and the autoclave was pressurized to the desired level with $H_2S$. The autoclave pressure was maintained constant with $H_2S$ for the duration of the run.

At time intervals, the stirrer was stopped for three minutes to allow the free elemental sulfur to settle and a sample of the supernatant liquid was withdrawn by the procedure previously described. These time interval samples were labeled, sealed and set aside for product analysis.

The test results as shown in the tables below. The test procedure described above was used in all tests unless otherwise indicated.

The results shown in Tables I, II, III and IV below are at an $(NH_4)_2S_2O_3$ concentration in aqueous solution of about 30 weight percent (2.4 g moles per liter).

TABLE I

| Reaction Conditions: | Temperature - 294° F. Total Pressure - 75 psig. | | | | |
|---|---|---|---|---|---|
| Product Analysis | | | | | |
| Sample No. | Initial | 1 | 2 | 3 | 4 |
| Time, min. | | 0 | 60 | 120 | 180 |
| Composition, mol/l | | | | | |
| $(NH_4)_2S_2O_3$ | 2.400 | 2.268 | 2.024 | 1.930 | 1.898 |
| $(NH_3)_2S \cdot S_x$ | 0.0 | 0.153 | 0.160 | 0.210 | 0.225 |
| $NH_4SH$ | 0.0 | 0.0 | 0.0 | 0.0 | 0.0 |
| $NH_4OH$ | 0.0 | 0.135 | 0.320 | 0.420 | 0.310 |
| $S_x$ | | | | | |
| x | | | | | |
| $NH_3/H_2S$ mol. ratio[1] | | 2.88 | 4.00 | 4.00 | 3.38 |

[1] calculated value

TABLE II

| | Reaction Conditions: Temperature - 312° F. Total Pressure - 160 psig. | | | | | | | | |
|---|---|---|---|---|---|---|---|---|---|
| Product Analysis | | | | | | | | | |
| Sample No. | Initial | 0 | 1 | 2 | 3 | 4 | 5 | 6 | 7 |
| Time, min. | | 0 | 5 | 15 | 30 | 60 | 90 | 120 | 150 |
| Composition, mol/l | | | | | | | | | |
| $(NH_4)_2S_2O_3$ | 2.444 | 2.290 | 1.388 | 0.708 | 0.270 | 0.054 | 0.050 | 0.034 | 0.026 |
| $(NH_4)_2S \cdot S_x$ | | 0.147 | 0.498 | 0.818 | 1.183 | 1.535 | 1.478 | 1.438 | 1.505 |
| $NH_4SH$ | | 0.0 | 0.0 | 0.0 | 0.0 | 0.0 | 0.0 | 0.0 | 0.0 |
| $NH_4OH$ | | 0.014 | 0.793 | 1.397 | 1.458 | 1.250 | 1.285 | 1.305 | 1.062 |
| $S_x$ | | 0.636 | 0.723 | 2.397 | 2.971 | 4.044 | 4.596 | 5.198 | 4.137 |
| x | | 4.327 | 1.452 | 2.930 | 2.511 | 2.635 | 3.116 | 3.615 | 2.749 |
| $S^{ol}$ | | | 3.04 | 3.74 | 4.71 | 4.40 | 3.86 | 3.32 | 4.40 |
| $S^{ol}$ | | | 2.79 | 3.67 | 4.68 | 4.50 | 3.89 | 3.16 | 4.00 |
| $NH_3/H_2S$ mol ratio[1] | | | 3.59 | 3.71 | 3.23 | 2.81 | 2.87 | 2.88 | 2.71 |

[1] Calculated value

TABLE III

| | Reaction Conditions: Temperature - 312° F. Total Pressure - 200 psig. | | | | | | |
|---|---|---|---|---|---|---|---|
| Product Analysis | Initial | 1 | 2 | 3 | 4 | 5 | 6 |
| Sample No. | | | | | | | |
| Time, min. | | 0 | 2 | 10 | 20 | 50 | 80 |
| Composition, mol/l | | | | | | | |
| $(NH_4)_2S_2O_3$ | 2.414 | 2.354 | 1.804 | 0.706 | 0.180 | 0.046 | 0.042 |
| $(NH_4)_2S \cdot S_x$ | | 0.148 | 0.352 | 0.995 | 1.463 | 1.845 | 1.883 |
| $NH_4SH$ | | 0.024 | 0.0 | 0.0 | 0.0 | 0.0 | 0.0 |
| $NH_4OH$ | 0.0 | 0.432 | 0.990 | 1.034 | 0.590 | 0.515 | |
| $S_x$ | | | 0.249 | 2.500 | 4.455 | 5.335 | 5.366 |
| x | | | 0.707 | 2.51 | 3.05 | 2.89 | 2.85 |
| $NH_3/H_2S$ mol ratio[1] | | 1.86 | 3.23 | 2.99 | 2.71 | 2.32 | 2.27 |
| $S^{ol}$ | | | 1.91 | 3.54 | 3.45 | 3.05 | 3.03 |
| $S^{ol}$ | | | 2.02 | 3.46 | 3.47 | 3.23 | 3.20 |

[1] Calculated value

TABLE IV

Reaction Conditions: Temperature - 345° F.
Total Pressure - 200 psig
Gas Flow - 4 $V_1/V_2$[1]

| Product Analysis Sample 220 | Initial | 1 | 2 | 3 | 4 | 5 | 6 | 7 |
|---|---|---|---|---|---|---|---|---|
| Time, min | | 0 | 4 | 8 | 16 | 25 | 39 | 58 |
| Composition, mol/l | | | | | | | | |
| $(NH_4)_2S_2O_3$ | 2.400 | 2.302 | 0.750 | 0.618 | 0.216 | 0.076 | 0.036 | 0.028 |
| $(NH_4)_2S \cdot S_x$ | 0.0 | 0.109 | 0.605 | 0.595 | 0.655 | 0.755 | 0.885 | 1.090 |
| $NH_4SH$ | 0.0 | 0.066 | 0.0 | 0.0 | 0.0 | 0.0 | 0.0 | 0.0 |
| $NH_4OH$ | 0.0 | | 0.058 | 0.718 | 1.101 | 0.722 | 1.006 | 1.164 |
| $S_x$ | 0.0 | | 1.068 | 2.176 | 2.887 | 3.049 | 3.445 | 4.565 |
| x | | | 2.66 | 3.66 | 4.41 | 4.04 | 3.89 | 4.19 |
| $S^o$ | | | 0.928 | 1.64 | 1.94 | 1.42 | 2.11 | 2.12 |
| $NH_3/H_2S$ mol ratio | | 1.62 | 2.10 | 3.21 | 3.68 | 2.96 | 3.10 | 3.07 |

[1] $V_1/V_2 = \frac{\text{Exit Gas Vol, mol/hr}}{\text{Reactor Gas Vol, mol}}$

In this test a gas flow of $H_2S$ through the autoclave was used at the rate shown.

The test shown below in Tables V and VI shows a test run outside the effective temperature range initially with the temperature being increased from 230° F. as shown in Table V to 292° F. as shown in Table VI.

TABLE V

Reaction Conditions: Temperature - 230°
Total Pressure - 150 psig
Gas Flow - Static

| Product Analysis Sample 220 | Initial | 1 | 2 | 3 |
|---|---|---|---|---|
| Time, min | | 0 | 120 | 240 |
| Composition, mol/l | | | | |
| $(NH_4)_2S_2O_3$ | 2.286 | 1.610 | 1.152 | 0.956 |
| $(NH_4)_2S \cdot S_x$ | 0.0 | 0.610 | 0.775 | 0.860 |
| $NH_4SH$ | 0.0 | 0.0 | 0.0 | 0.0 |
| $NH_1OH$ | 0.0 | 0.390 | 0.290 | 0.480 |
| $S_x$ | — | — | — | — |
| x | — | — | — | — |
| $S^o$ | — | — | — | — |
| $NH_3/H_2S$ mol ratio | — | 2.00 | 2.37 | 2.56 |

TABLE VI

Reaction Conditions: Temperature - 292° F.
Total Pressure - 135 psig
Gas Flow - Static

| Product Analysis Sample No. | Initial | 1 | 2 | 3 | 4 |
|---|---|---|---|---|---|
| Time, min | | 0 | 60 | 180 | 240 |
| Composition, mol/l | | | | | |
| $(NH_4)_2S_2O_3$ | 2.286 | 0.034 | 0.118 | 0.084 | 0.056 |
| $(NH_4)_2S \cdot S_x$ | | 0.855 | 1.015 | — | 1.060 |
| $NH_4SH$ | 0.0 | 0.0 | 0.0 | — | 0.0 |
| $NH_4OH$ | 0.0 | 0.990 | 1.050 | — | 1.140 |
| $S_x$ | 0.0 | 2.610 | 3.40 | — | 2.903 |

TABLE VI-continued

Reaction Conditions: Temperature - 292° F.
Total Pressure - 135 psig
Gas Flow - Static

| Product Analysis Sample No. | Initial | 1 | 2 | 3 | 4 |
|---|---|---|---|---|---|
| Time, min | | 0 | 60 | 180 | 240 |
| Composition, mol/l | | | | | |
| x | | | 3.05 | 3.35 | — | 2.74 |
| $(NH_4)_2SO_4$ | trace | | | | trace |
| $S^o$ | | | 2.79 | 2.76 | | 3.62 |
| $NH_3/H_2S$ mol ratio[1] | | | 3.16 | 3.03 | | 3.08 |

[1] Based on reduction product.

Further tests were run at an $(NH_4)_2S_2O_3$ concentration of about 3.6 weight percent (0.24 moles per liter) and although the temperature was in the desired range the $NH_3/H_2S$ mole ratio produced was below the desired range. The test results are shown in Tables VII and VIII below. While ammonium thiosulfate was present in the aqueous product stream the amounts present were apparently too small to prevent the presence of $NH_4HS$ in the product stream. By reference to the tables for the tests at a higher initial concentration it will be noted that no $NH_4HS$ was found in the product streams in the tests.

TABLE VII

Reaction Conditions: Temperature - 309° F.
Total Pressure - 200 psig

| Product Analysis Sample No. | Initial | 1 | 2 | 3 | 4 | 5 | 6 |
|---|---|---|---|---|---|---|---|
| Time, min | | 0 | 15 | 30 | 45 | 60 | 90 |
| Composition, mol/l | | | | | | | |
| $(NH_4)_2S_2O_3$ | 0.237 | 0.166 | 0.046 | 0.034 | 0.034 | 0.044 | 0.036 |
| $(NH_4)_2S \cdot S_x$ | | 0.155 | 0.110 | 0.132 | 0.165 | 0.114 | 0.288 |
| $NH_4SH$ | | 0.030 | 0.330 | 0.288 | 0.233 | 0.324 | 0.288 |
| $NH_4OH$ | | 0.0 | 0.0 | 0.0 | 0.0 | 0.0 | 0.0 |
| $S_x$ | | — | — | — | — | — | — |
| X | | — | — | — | — | — | — |
| $NH_3/H_2S$ mol ratio | | 1.84 | 1.25 | 1.31 | 1.43 | 1.26 | 1.31 |

TABLE VIII

Reaction Conditions: Temperature - 270° F.
Total Pressure - 160 psig

| Product Analysis Sample No. | Initial | 1 | 2 | 3 | 4 | 5 | 6 | 7 | 8 |
|---|---|---|---|---|---|---|---|---|---|
| Time, min | | 0 | 10 | 15 | 37 | 45 | 60 | 90 | 120 |
| Composition, mol/l | | | | | | | | | |
| $(NH_4)_2S_2O_3$ | 0.237 | 0.222 | 0.168 | 0.150 | 0.086 | 0.070 | 0.052 | 0.044 | 0.058 |
| $(NH_4)_2S \cdot S_x$ | 0.0 | 0.085 | 0.142 | 0.095 | 0.035 | 0.182 | 0.089 | 0.184 | 0.242 |
| $NH_4SH$ | 0.0 | 0.0 | 0.028 | 0.210 | 0.410 | 0.188 | 0.386 | 0.209 | 0.128 |
| $NH_4OH$ | 0.0 | 0.042 | 0.0 | 0.0 | 0.0 | 0.0 | 0.0 | 0.0 | 0.0 |
| $S_x$ | — | — | — | — | — | 0.430 | — | 0.442 | 0.417 |
| x | — | — | — | — | — | 2.36 | — | 2.41 | 1.72 |
| $NH_3/H_2S$ mol ratio | | 3.00 | 1.84 | 1.31 | 1.09 | 1.49 | 1.19 | 1.47 | 1.65 |

The pressure of $H_2S$ in the reaction zone is not considered to be critical. By reference to Tables I–VI it will be observed that no $H_2S$ or $NH_4HS$ was found in the product solution. Since the $H_2S$ if absorbed would be found in one of these forms it may be concluded that the reactions are consuming the $H_2S$ as fast as it is absorbed, especially in view of the elevated temperature at which the reaction is conducted. While applicant does not wish to be bound by any particular theory it is suggested that the $H_2S$ is absorbed primarily as $NH_4HS$ by reaction 5 shown below $$NH_4OH + H_2S \rightarrow NH_4HS + H_2O \quad (5)$$

and that the $(NH_4)_2S.S_x$ is formed via a reaction such as reaction (6) shown below $$NH_4HS + (NH_4)_2S_2O_3 + 2H_2S \rightarrow (NH_4)_2S.S_4 + 2H_2O + NH_4OH \quad (6)$$

since ammonium hydroxide is produced in the aqueous product stream as the reaction proceeds. Clearly other reactions are possible and probably occur to some extent, but it appears that at least a portion of the ammonium thiosulfate is converted by the two reactions shown above since $NH_4OH$ is produced and since no $NH_4HS$ was observed except when very dilute solutions are used. Possibly after substantially all the $(NH_4)_2S_2O_3$ has been reacted $NH_4HS$ may be found in the solution however such is not considered to be within the scope of the present invention since the resulting $NH_3/H_2S$ ratio is outside the desired range.

Having thus described the invention, I claim:

1. In a process for removing sulfur oxides from a gaseous mixture, said process consisting essentially of:

(a) contacting said gaseous mixture with a first aqueous solution containing $(NH_4)_2S_2O_3$ and at least one alkaline compound selected from the group consisting of $NH_3$ and $NH_4OH$ to remove said sulfur oxides from said gaseous mixture and produce a second aqueous solution containing at least one compound selected from the group consisting of $(NH_4)_2S_2O_3$, $(NH_4)_2SO_3$ and $(NH_4)HSO_3$;

(b) withdrawing a first portion of said second aqueous stream and passing said first portion to sulfur recovery;

(c) adding at least one alkaline compound selected from the group consisting of $NH_3$ and $NH_4OH$ and at least one sulfide compound selected from the group consisting of $H_2S$, $NH_4HS$ and $(NH_4)_2S$ to a second portion of said second aqueous stream to produce said first aqueous solution, said alkaline compound and said sulfide compound being added in a molar ratio ($NH_3/H_2S$) from about 2.8 to about 3.2;

(d) contacting said first portion of said second aqueous stream with $H_2S$ to convert at least a portion said $(NH_4)_2S_2O_3$, $(NH_4)_2SO_3$ and $(NH_4)HSO_3$ to ammonium polysulfide, thereby producing an aqueous ammonium polysulfide stream; and (e) heating said aqueous ammonium polysulfide stream to decompose said ammonium polysulfide and produce $NH_3$, $H_2S$ and sulfur, the improvement comprising adjusting the concentration of ammonium thiosulfate in said first portion to form about 25 to about 35 weight percent ammonium thiosulfate, contacting said first portion with $H_2S$ at a pressure from about 100 to about 300 psig at a temperature from about 125° to about 182° C. to react at least about 70 percent of said ammouium thiosulfate thereby producing an aqueous product solution containing at least 0.085 g mols of ammonium thiosulfate per liter of solution and ammonium polysulfide which, upon decomposition produces a gaseous mixture of $NH_3$ and $H_2S$ in a molar ratio ($NH_3/H_2S$ from about 2.8 to about 3.2 and sulfur and recycling said gaseous mixture to step (c).

* * * * *

UNITED STATES PATENT AND TRADEMARK OFFICE
CERTIFICATE OF CORRECTION

PATENT NO. : 4,231,996
DATED : November 4, 1980
INVENTOR(S) : Metro D. Kulik

It is certified that error appears in the above—identified patent and that said Letters Patent is hereby corrected as shown below:

Column 1, line 6 - "996,686" should read --966,686--

Column 1, line 55 - "bisulfurite" should read --bisulfite--

Column 3, line 52 - "($NH_3H_2S$)" should read --($NH_3/H_2S$)--

Column 7, line 2 - "345°" should read --354°--

Column 8, line 36 - "0.233" should read --0.223--

Column 8, line 69 reaction (5) should read $$--NH_4OH + H_2S \rightarrow NH_4HS + H_2O--$$

Column 10, line 23 - "form" should read --from--

Signed and Sealed this

Twenty-first Day of July 1981

[SEAL]

Attest:

GERALD J. MOSSINGHOFF

Attesting Officer           Commissioner of Patents and Trademarks